United States Patent
Little et al.

(10) Patent No.: US 8,112,794 B2
(45) Date of Patent: Feb. 7, 2012

(54) MANAGEMENT OF MULTIPLE CONNECTIONS TO A SECURITY TOKEN ACCESS DEVICE

(75) Inventors: Herbert A. Little, Waterloo (CA); Neil P. Adams, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1183 days.

(21) Appl. No.: 11/458,032

(22) Filed: Jul. 17, 2006

(65) Prior Publication Data

US 2008/0016537 A1  Jan. 17, 2008

(51) Int. Cl.
G06F 7/04 (2006.01)
G06F 15/16 (2006.01)
G06F 17/30 (2006.01)
H04L 29/06 (2006.01)

(52) U.S. Cl. ........... 726/9; 726/2; 726/3; 726/6; 726/14; 726/18; 726/20; 380/270; 713/182; 713/183; 713/185

(58) Field of Classification Search ........................ 726/9
See application file for complete search history.

(56) References Cited

U.S. PATENT DOCUMENTS

| | | | | |
|---|---|---|---|---|
| 6,084,968 A * | 7/2000 | Kennedy et al. | ............... | 380/259 |
| 6,466,804 B1 | 10/2002 | Pecen et al. | | |
| 6,778,824 B2 * | 8/2004 | Wonak et al. | ............... | 455/426.2 |
| 7,738,569 B2 * | 6/2010 | Quinn et al. | .................... | 375/259 |
| 2002/0095587 A1 * | 7/2002 | Doyle et al. | .................... | 713/186 |
| 2004/0042604 A1 * | 3/2004 | Hiltunen et al. | ......... | 379/211.05 |
| 2005/0125664 A1 * | 6/2005 | Berkema et al. | ............... | 713/168 |
| 2006/0143455 A1 * | 6/2006 | Gitzinger | ...................... | 713/170 |
| 2006/0251256 A1 * | 11/2006 | Asokan et al. | ................. | 380/270 |

FOREIGN PATENT DOCUMENTS

| | | |
|---|---|---|
| EP | 1049306 A | 11/2000 |
| EP | 1605627 A | 12/2005 |
| EP | 1635508 A | 3/2006 |
| EP | 1635508 A1 * | 3/2006 |
| EP | 1713205 A | 10/2006 |
| WO | WO 02/21867 | 3/2002 |
| WO | 02063576 A1 | 8/2002 |
| WO | 2006031473 A | 3/2006 |

OTHER PUBLICATIONS

Maier, R.: "Authentication and paring in limited mobile environments" INET, [Online] Mar. 17, 2004 (Apr. 17, 2004), XP002396358 INET. Retrieved from the Internet: URL:http//www.esat.kuleuven.ac.be/cosic/seminars/slides/seminar-2004-03-17.pdf> [retrieved on Aug. 24, 2006].
Examination Report dated Feb. 14, 2011 from EP06117312.

* cited by examiner

*Primary Examiner* — David Pearson
*Assistant Examiner* — Narciso Victoria
(74) *Attorney, Agent, or Firm* — Jenna L. Wilson; Dimock Stratton LLP

(57) ABSTRACT

A security token access device, a user device such as a computing device or communications device, and a method for managing multiple connections between multiple user devices and the access device. The access device maintains connection information, including security information, for each user device securely paired with the access device. Each time a new user device is paired with the access device, the access device transmits a notification to the user devices already paired to the user device. A user may provide instructions to the access device to terminate a pairing with one of the user devices by overwriting at least a portion of the connection information associated with the designated user device. A user device may further request a listing of all user devices currently paired with the access device.

23 Claims, 6 Drawing Sheets

| DEVICE ADDRESS | BLUETOOTH LINK KEY | SECURE PAIRING KEY OR MASTER CONNECTION KEY | CONNECTION TIMESTAMP |
|---|---|---|---|
| A6:00:01:00:7F:AB | EFDD389AFB5B064B | FE8BB3579D41.... | 200606192315 |
| A6:00:01:05:10:CA | 2DE957D5AA1C6C26 | 0000000000000000 | 000000000000 |
| A6:00:01:3D:DB:00 | 556A977BAD0389DE | 72EEF43295A2.... | 200606192203 |
| 00:00:00:00:00:00 | 0000000000000000 | 0000000000000000 | 000000000000 |

Smart Card Reader Settings
Reader ID: 861345
Connected: Yes

| Reader LED Settings | |
| --- | --- |
| Low Battery (Red): | Enabled |
| Pairing (Green): | Enabled |
| Traffic (Blue): | Enabled |
| Reader Settings | |
| Connection Heart Beat Period: | 10 min |
| Power Off Timeout: | 30 min |
| Power Saving Mode: | Disabled |
| Bluetooth® Range: | Long (7) |
| Erase Key After | |
| Disconnected Timeout: | None |
| Erase ALL keys: | Enabled |
| Long Term Timeout: | None |
| Inactivity Timeout: | None |
| Card Not Present Timeout: | None |
| Number of Transactions: | None |

| User Device Settings | |
| --- | --- |
| Low Battery Ribbon Indicator: | Enabled |

250

| Reader Status | |
| --- | --- |
| IT Policy Name: | Neil |
| Policies Match: | Yes |
| Platform Version: | 0.0.0.1 |
| Application Version: | 0.0.0.1 |
| Cryptographic Kernel: | 3.8.0.27b |
| Transaction Count: | 345 |
| Battery Status: | Good Low Charging Full |

270

Paired Devices
Neil's PDA
NDADAMS-LT
NADAMS-2K

Info
Delete
Cancel

MANAGEMENT OF MULTIPLE CONNECTIONS TO A SECURITY TOKEN ACCESS DEVICE

BACKGROUND

1. Technical Field

The present invention relates generally to security token access devices, and in particular to the management of connections to a security token access device that is capable of maintaining connections with multiple user devices.

2. Description of the Related Art

Security tokens are physical devices for use in authenticating a user of a computer or communication system or device to that system or device. Security tokens may comprise memory for storing financial or personal data, or private data such as private keys used in the S/MIME (Secured Multipurpose Internet Mail Extensions) encryption technique. Preferably, some of this data may be secured using a PIN (personal identification number) or a password as an access control measure, such that the user must be validated to the security token by providing the correct PIN or password before accessing the protected data stored in the token's memory. A common type of security token is a smart card, also referred to as a chip card or integrated circuit card, which is typically used in association with a smart card access devices with an embedded integrated circuit (such as a microprocessor and/or memory) for use as storage of sensitive data or user authentication. Applications of security tokens are known in the art.

Some security tokens are used in conjunction with an access device, such as a reader or read/write device that establishes a communication link between the security token and the user device. The access device may store and maintain information relating to a valid communication link, such as the address of the user device, pairing information and cryptographic keys, and the like. Security information, which may include pairing information, may be required in order to have a secure connection between the access device and the user device. If the security information is not present, then a secure pairing must first be established before the user device can receive or transmit data from or to the security token.

However, access devices typically rely on a dedicated connection with the connecting device, such as a Universal Serial Bus (USB) connection between the user device and the access device, or a wireless communication link between the access device and a single connecting device. Therefore, the security token access device is effectively dedicated for use with a single user device, and cannot be used in conjunction with a further user device without first severing the connection between the first device and the security token access device. This is inconvenient for a user who uses multiple user devices, for example a personal computer and a mobile communication device, and requires the use of the security token and access device with the multiple user devices in order to perform secure operations with the user devices, such as digitally signing electronic messages sent from the user devices.

BRIEF DESCRIPTION OF THE DRAWINGS

In drawings which illustrate by way of example only a preferred embodiment,

FIG. 3 is a table representing connection information stored by the access device of FIG. 1.

FIG. 5 is a schematic diagram of a user menu for listing a set of paired user devices for an access device together with a context menu for one of the listed paired user devices.

DETAILED DESCRIPTION

Provided is a system and method by which a security token access device may be used with multiple user devices. However, because the access device may be provided with sparse user interface means, it is further desirable to provide a method of managing connections to the access device, and to provide means to allow a user to issue instructions to the access device concerning the user devices connected to the access device.

Figure 1:
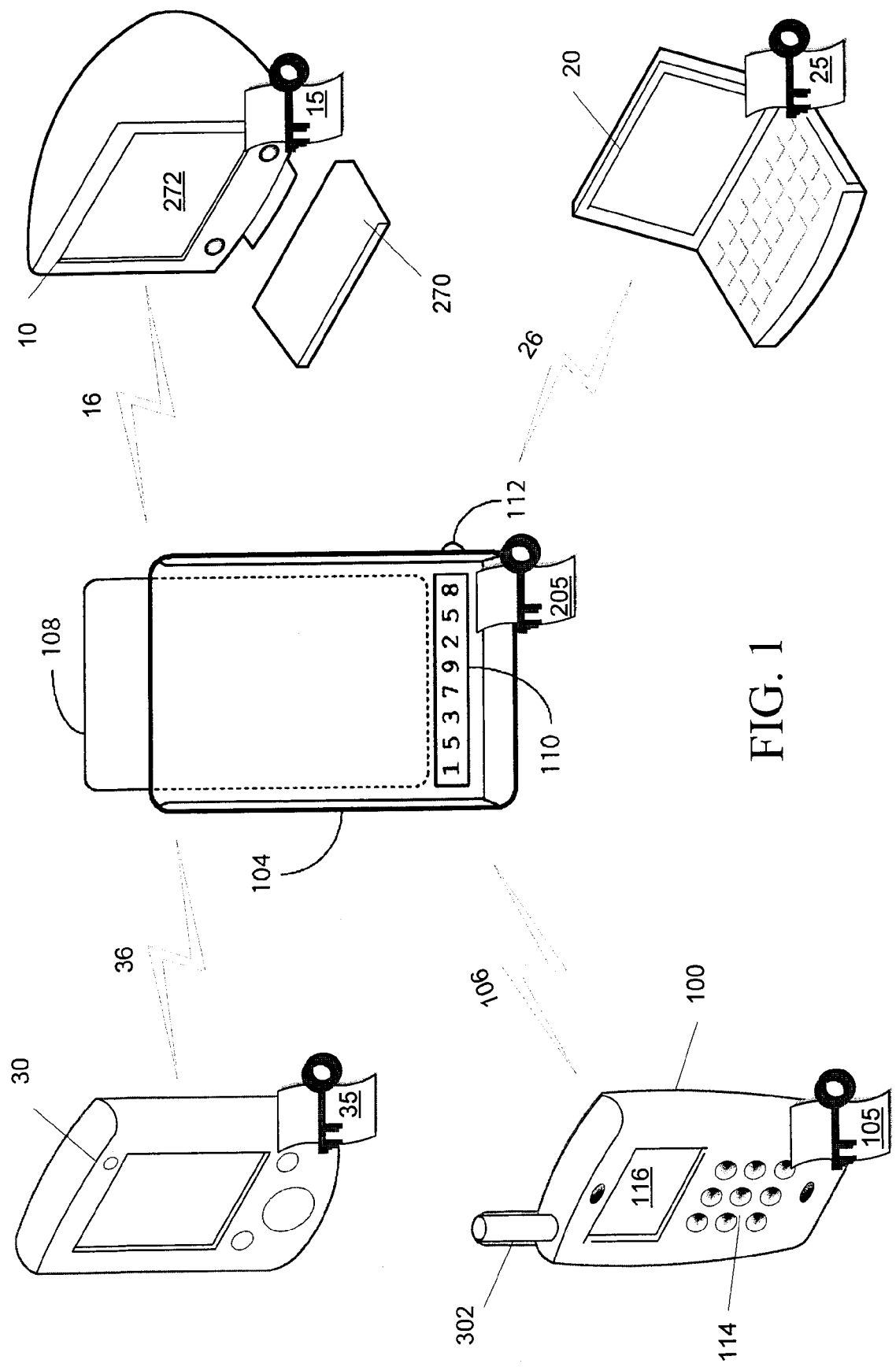
FIG. 1 is a schematic diagram of a system comprising a plurality of user devices, a security token, and a security token access device.

Referring to FIG. 1, an overview of an exemplary system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the simple overview of FIG. 1.

FIG. 1 shows a first user device, shown here as a personal computer 10; a second user device, shown here as a second personal computer 20; a third user device shown here as a personal digital assistant 30; and a fourth user device, here a mobile communication device 100. It will be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "communication device", "computing device", or "user device" may be used interchangeably.

Each of these user devices may, for example, be connected to an Internet Service Provider on which a user of the system of FIG. 1, likely the user associated with each of the user devices illustrated in FIG. 1, has an account. The system of FIG. 1 may be located within a company, possibly connected to a local area network, and connected to the Internet or to another wide area network, or connected to the Internet or other network through a large application service provider. Other features for network connectivity, such as the infrastructure of the local area network, Internet, wide area network, wireless gateway, and the like, are not shown in FIG. 1 but are known to those having ordinary skill in the art. Of the user devices, preferably at least the mobile communication device 100 is capable of sending and receiving messages and other data via wireless transmission, typically at a radio frequency (RF), from a base station in a wireless network to the user device. The particular network may be any wireless network over which messages may be exchanged with a user device such as the mobile communication device 100. The user devices may receive data by other means, for example through a direct connection to a port provided on the user device such as a Universal Serial Bus (USB) link.

Each of the user devices 10, 20, 30, 100 is capable of communicating with a security token access device 104 over a wired or wireless communication link, but in the preferred embodiment described below, the communication between the access device 104 and the user devices 10, 20, 30, 100 takes place over a wireless communication link. A non-exhaustive list of examples of wireless local area network standards for wireless communication link 106 includes the Institute of Electrical and Electronic Engineers (IEEE) for Wireless LAN MAC and Physical layer (PHY) 802.11a, b, g and n specifications or future related standards, the Bluetooth® standard, the Zigbee™ standard and the like. The security token access device 104 may comprise a reader device or a read-write device. Thus, for example, if the security token access device 104 is a read-write device, the access device 104 may be configured to not only read data from an associated security token, but to also write data to the security token. It will be appreciated by those skilled in the art that the systems and methods disclosed herein may incorporate a security token access device that is capable of both reading and writing to a security token, and that the embodiments described herein are not limited to a security token reader device.

A security token, here shown as a smart card 108, is shown inserted into the access device 104. Smart cards are personalized security devices, defined by the ISO7816 standard and its derivatives, as published by the International Organization for Standardization. A smart card may have a form factor of a credit card and may include a semiconductor device. The semiconductor device may include a memory that can be programmed with a secret key and with an authentication certificate, and may include a decryption engine, e.g., a processor and/or dedicated decryption logic. The smart card's functionality may be embedded in a device having a different form factor and being capable of communicating over an additional communication protocol, for example a USB device.

The security token 108 may include a connector for powering the semiconductor device and performing serial communication with an external device. The access device 104 may be provided in one of a number of form factors, including, but not limited to, a portable access device that can be worn on the person, for example by means of a lanyard (not shown) suspended around a user's neck. Alternatively, the access device 104 may be provided in a desktop reader or reader-writer form factor, or other form factor suitable for the security token environment that will be apparent to the skilled reader.

The user whose security information is stored on the security token 108 may use the access device 104 for identification and to digitally sign and/or decrypt messages sent by the user device 10, 20, 30, 100. For example, one or more of the user devices 10, 20, 30, 100 may be able to send and receive e-mail messages via an e-mail server (not shown). The user devices 10, 20, 30, or 100 may be configured to employ the Secure Multipurpose Internet Mail Extensions (S/MIME) protocol, such that e-mail messages received at the user devices 10, 20, 30, or 100 are encrypted using a symmetric algorithm with a random session key generated by the sender of the e-mail message and encrypted by the recipient's (most likely the user's) public key and sent with the message, and messages sent from the user devices 10, 20, 30, or 100 are likewise encrypted with a random session key generated at the user devices 10, 20, 30, or 100. Upon receipt of an encrypted e-mail message, a user device 10, 20, 30, or 100 may extract the encrypted session key and send it to access device 104 via the preferably secure communication link 16, 26, 36, or 106.

The access device 104 then sends the encrypted session key to the security token 108, and the decryption engine of the security token 108 may decrypt the encrypted session key using the recipient's private decryption key, which is stored in the security token 108. The access device 104 retrieves the decrypted session key from the security token 108 and forwards it to the user device 10, 20, 30, or 100 via communication link 16, 26, 36, or 106 so that the user device can decrypt the received e-mail message. The security token 108 may prevent unauthorized use of the recipient's private decryption key by requiring that a password or personal identification number (PIN) be supplied at the user device 10, 20, 30, or 100 (and verified against a password or PIN stored at the security token 108 either in the clear or in an encoded form) before allowing the decryption operation to proceed.

Similarly, to add a digital signature to an e-mail message being sent by a user device 10, 20, 30, or 100, the user device may send a hash of the contents of the e-mail message to the access device 104 over the communication link 16, 26, 36, or 106. The access device 104 passes the hash to the security token 108, which produces a digital signature from the hash and the sender's private signing key, which is stored in the security token 108. The security token 108 then passes the digital signature to the access device 104, which forwards it to the user device 10, 20, 30, or 100 via the communication link 16, 26, 36, or 106 so that the user device can transmit it along with the e-mail message to the e-mail server. Again, the security token 108 may prevent unauthorized use of the recipient's private signing key by requiring that a password or PIN be supplied before allowing the signing operation to proceed.

As those skilled in the art will appreciate, one or more of the user devices 10, 20, 30, 100 may be configured to provide other functions besides encryption that may require authentication by the security token 108 via the access device 104.

Figure 2:
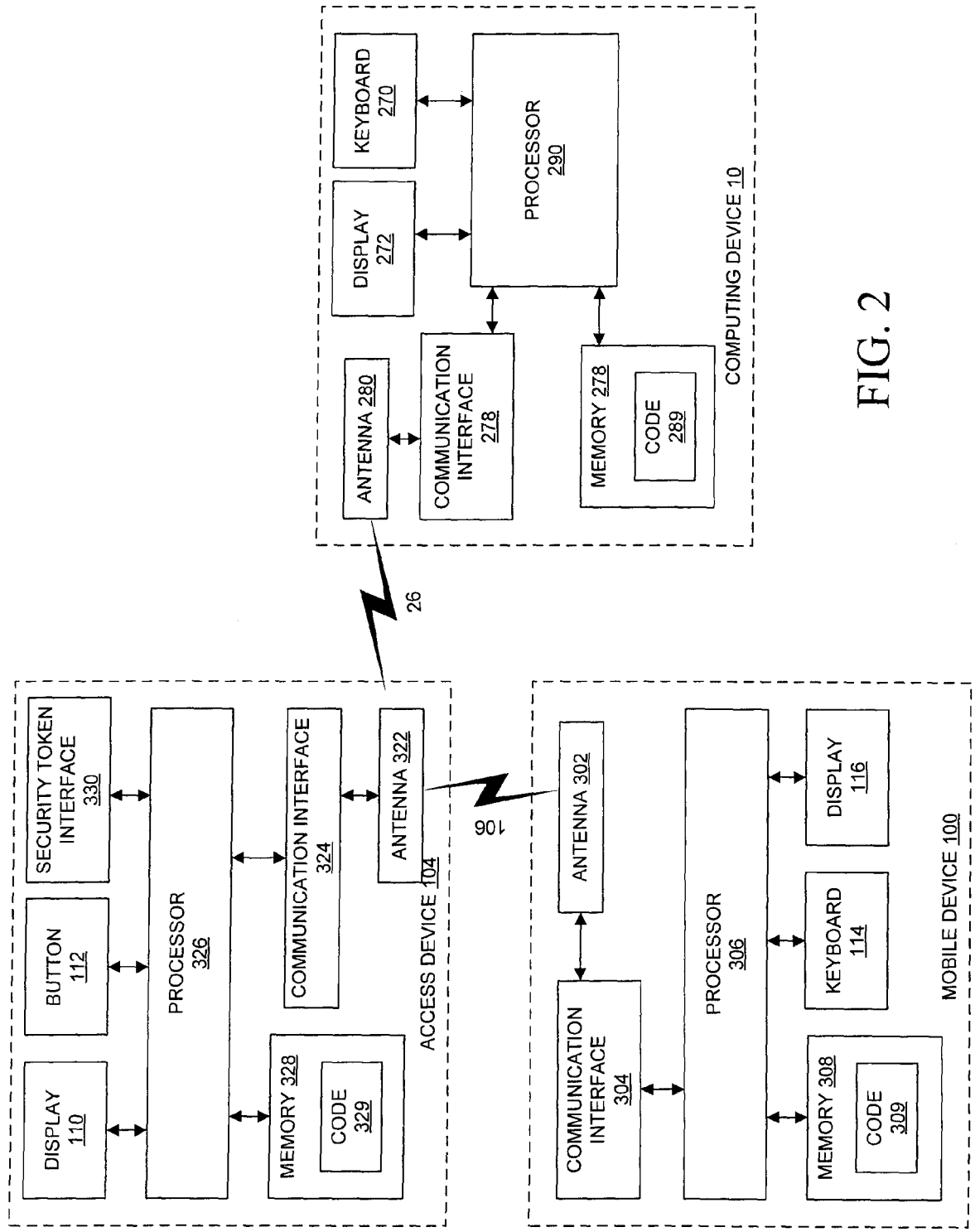
FIG. 2 is a block diagram of an access device, mobile communication device, and a computing device of FIG. 1.

A block diagram of the access device 104, a mobile device 100, and a computing device such as the personal computer 10 is provided in FIG. 2. In the preferred embodiment, the access device 104, the mobile device 100, and the personal computer 10 each comprises a two-way RF communication device having data communication capabilities and optionally voice communication capabilities. Preferably each of the mobile device 100 and the personal computer 10 has the capability to communicate with other computer systems via a local or wide area network.

The access device 104 preferably comprises a processor 326, configured to execute code 329 stored in a memory element 328. The processor 326 and memory element 328 may be provided on a single application-specific integrated circuit, or the processor 326 and the memory element 328 may be provided in separate integrated circuits or other circuits configured to provide functionality for executing program instructions and storing program instructions and other data, respectively. The processor is connected to a security token interface 330. The memory 328 may comprise both volatile and non-volatile memory such as random access memory (RAM) and read-only memory (ROM); preferably sensitive information, such as keys and personal identification numbers (PINs), are stored in volatile memory.

The code 329 provided in the access device 104 may include operating system software, password verification code, and specific applications, which may be stored in non-volatile memory. For example the code 329 may comprise drivers for the access device 104 and code for managing the drivers and a protocol stack for communicating with the communications interface 324 which comprises a receiver and a transmitter (not shown) and is connected to an antenna 322.

The access device 104 may also be configured to interface with the user via the input means 112, here provided as a button for manipulation by the user, and via the display 110, here a single-line readout for displaying strings of alphanumeric characters as shown in FIG. 1. The communications interface 324 may also comprise other processing means, such as a digital signal processor and local oscillators. The access device 104 may include a power supply (not shown), which in the case of a portable security token access device is provided by at least one battery or power cell. Preferably the casing and the power supply of the access device 104 is configured such that removal of the casing disconnects the power supply, thereby clearing the volatile memory of the access device 104. The access device 104 may also be provided with a further output means, not shown, such as a light emitting diode (LED), which may be tri-coloured for indicating the status of the access device 104.

The mobile device 100 comprises an input means, shown in FIG. 1 as a reduced keyboard 114, although alternative or additional input means, such as thumbwheels and buttons, may also be provided. The mobile device 100 also comprises an output means, such as a display 116; the mobile device 100 may also be provided with a speaker, not shown. The mobile device comprises an antenna 302 connected to a communication interface 304, which in turn communicates with a processor 306. The communication interface 304 may include similar components as the communication interface 324 of the access device 104, such as a digital signal processor, local oscillator, a receiver, and a transmitter. The processor 306 accesses a memory element 308 which stores code 309, which may include operating system software and application-specific software, as well as drivers and protocol stacks for handling communication over one or more communication links, such as the wireless communication link 106. The memory element 308 may include both volatile and non-volatile memory. The memory element 308 and the processor 306 may be provided in a single application-specific integrated circuit, or may be provided as separate components. The processor 306 may execute a number of applications that control basic operations, such as data and voice communications via the communication interface 304, as well as a personal information manager that may be installed during manufacture and e-mail client for composing, editing, digitally signing and encrypting and digitally verifying and decrypting messages.

Similarly, a personal computer 10 is provided with an input device such as a keyboard 270, and is provided with an output means such as a monitor 272. If the personal computer 10 is capable of wireless communication with the access device 104, then it will also comprise an antenna 280 in communication with a communications interface 278 as shown in FIG. 2, which like the communications interfaces of the mobile device 100 and the access device 104, may comprise a receiver, transmitter, digital signal processor, and local oscillators. The personal computer 10 may comprise multiple data storage means, denoted in FIG. 2 by the memory element 284. The memory 284 may include RAM, ROM, and other storage media including a hard drive and removable digital storage media; the memory 284 stores code 289 that is executed by the processor 290. The code 289 may include operating system software, drivers for the communications interface 278, a protocol stack for communicating via the communications interface 278, a personal information manager and an e-mail client for composing, editing, digitally signing and encrypting and digitally verifying and decrypting messages. The personal information manager, e-mail client, and other data stores on the personal computer 10 are preferably capable of being reconciled with similar data stores on the mobile device 100.

The specific design and implementation of the communications interfaces of the access device 104, the mobile device 100, and the computing device 10, as well as the other user devices 20, 30, are dependent upon the communication network in which the devices are intended to operate. In a preferred embodiment, the user devices 10, 20, 30, 100 each communicate with the access device 104 via wireless communication links 16, 26, 30 and 106 respectively as illustrated in FIG. 1, for example in accordance with the Bluetooth® standard.

Preferably, in order to ensure the security of the wireless communication links 16, 26, 30 and 106, a system of pairing mechanisms is employed. For example, when the user device 10, 20, 30, or 100 determines that security token functionality is needed, the user device may attempt to detect the availability of a nearby security token access device 104. If this is the first time that the user device 10, 20, 30, or 100 has attempted to connect to the access device 104 or no previous wireless connection pairing between the user device 10, 20, 30, or 100 and the access device 104 currently exists, a wireless connection pairing step is carried out.

In the preferred embodiment, the access device 104 displays an identifier or access device ID, which is a preferably unique value associated with the access device 104, in the display 110. This access device ID may comprise the Media Access Control (MAC) address of the access device 104. The access device ID may be displayed in response to a user action, for example by pressing the button 112 on the access device 104. The user is prompted at by the user device attempting to pair with the access device 104 to enter the access device ID via the input means associated with the user device for storage in memory 308 or 284. This step thus identifies to the connecting user device 10, 20, 30, or 100 which access device 104 is to be used for security functions by the user device 10, 20, 30, or 100.

Once the access device ID is input on the user device 10, 20, 30, or 100, the connecting user device 10, 20, 30, or 100 may request from the access device 104 a list of supported encryption protocols and algorithms; the access device 104 may then create a list of supported protocols and algorithms and transmit it to the connecting user device. The connecting user device 10, 20, 30 or 100 then selects an encryption algorithm supported by the connecting user device, and transmits instructions to the access device 104 to use the selected algorithm for future processes, such as the wireless and secure pairings described below, as well as future encryption of messages between the devices.

Next, a security value is exchanged between the access device 104 and the connecting user device 10, 20, 30, or 100. The access device 104 is configured to display this security value, for example a PIN; the PIN is read by the user and entered on the connecting user device 10, 20, 30, or 100. The access device 104 may be configured to display the PIN once the button 112 is actuated, so for example, the connecting user device 10, 20, 30, or 100 may be configured to prompt the user to press the button 112 on the access device 104 as well as to enter the new value displayed by the access device 104. This completes the wireless connection pairing; the connecting user device 10, 20, 30, or 100 thus stores the access device ID and the PIN provided by the access device 104, for example in volatile memory. In a preferred embodiment, the access device 104 and the connecting user device 10, 20, 30, or 100 generate a wireless link key from the PIN thus exchanged between the access device 104 and the user device 10, 20, 30 or 100, and this wireless link key is stored by the access device 104 and the user device 10, 20, 30 or 100. The PIN is therefore not stored in memory on either device.

Further user devices 10, 20, 30, or 100 may be wireless connection paired at this stage in a similar manner. The access device ID displayed by the access device 104 will be the same as the value previously displayed; the PIN, however, may be a different value than the PIN used during the pairing of a previous device 10, 20, 30, or 100. The PIN may be a random value generated by the code 329 resident on the access device 104, seeded by one or more sources of entropy using techniques known in the art. Once the connecting user device 10, 20, 30, or 100 has stored the PIN or, more preferably, has generated and stored the wireless link key, it transmits a confirmation to the access device 104 and the access device 104 erases the PIN from the display 110. The wireless link key or PIN may be used in encrypting communications between the corresponding user device 10, 20, 30, and 100 and the access device 104.

Once the wireless connection pairing (or pairings) is (or are) established between one or more connecting user devices 10, 20, 30, or 100 and the access device 104, the user devices and the access device are preferably paired with a further secure pairing. For each connecting user device 10, 20, 30, or 100, the access device 104 is configured to display a secure pairing value, such as a secure pairing PIN, on its display 110, which is read by the user and entered on the connecting user device 10, 20, 30, or 100. The secure pairing value preferably comprises a random value, for example an eight-digit value, generated by the code 329 resident in the access device 104. The access device 104 may be configured to display this secure pairing value once the button 112 on the access device 104 is actuated, and again, the connecting user device 10, 20, 30, or 100 may be configured to prompt the user to enter the secure pairing value, and if necessary to press the button 112 in order to display the secure pairing value. After the secure pairing is complete, the connecting user device 10, 20, 30, or 100 may transmit confirmation that the value was received to the access device 104 before the access device 104 erases the secure pairing value from the display 110. The secure pairing value may be used by the connecting user device 10, 20, 30, or 100 and the access device 104 to generate a further connection key (a "secure pairing key"), preferably an Advanced Encryption Standard (AES) 256-bit key, for use in communications between the connecting user device 10, 20, 30, or 100 and the access device 104. This secure pairing key may be an encryption key or a master connection key for use in encrypting subsequent communications between the access device 104 and the user device 10, 20, 30, or 100; if the secure pairing key is a master connection key, it may be used to generate further encryption keys for use by the access device 104 and the user device 10, 20, 30 or 100. If the secure pairing value is used to generate a secure pairing key, then preferably the secure pairing value is erased from the memory of the access device 104 and the user device 10, 20, 30 and 100 after the secure pairing key is generated.

The communications link 16, 26, 36, or 106 is thus secured by a secure pairing key generated using the secure pairing value, and each device in the system thus securely paired with the access device 104 stores a secure pairing key, as indicated by the key material 15, 25, 35, and 105 shown in FIG. 1. The access device 104 further stores connection information or key material 205, which may comprise the address of each device 10, 20, 30 or 100 that may be connected to the access device 104, and may also comprise the secure pairing key shared with the connecting device, and preferably the timestamp of the secure pairing. A simple table schematic of the store of connection information 205 stored in the memory 328 of the access device 104 is shown in FIG. 3; in the embodiment shown here, the mobile communication device 100 and the computing device 20 have both completed the wireless pairing and secure pairing steps, and the key material 205 stored by the access device 104 therefore comprises a wireless link key (as shown in the accompanying drawings, the wireless link key is referred to as a "Bluetooth link key", thus reflecting an embodiment in which the Bluetooth protocol is employed) and security information comprising a secure pairing key. It can be seen that the computing device 10 has not been securely paired with the access device 104, and that the remaining user device 30 has not been wireless or securely paired with the access device 104 at all. It will be understood by those skilled in the art that the connection information 205 need not be stored in the memory 328 of the access device in the contiguous manner suggested by the accompanying drawings; for example, the access device 104 may be configured to store each value in the table of FIG. 3 at non-sequential memory addresses, or to store portions of each value at non-sequential memory addresses. Some values, such as the address of each device and the Bluetooth link key, may be stored in non-volatile memory, whereas the secure pairing keys are preferably stored in volatile memory such that if the power supply is disconnected from the memory 328 and/or processor 326, for example during a reset procedure, the secure pairing keys are erased from the memory 328.

Preferably, the system 100 is configured such that upon pairing of subsequent devices 10, 20, 30, or 100, the access device 104 transmits the device's identifier and/or its MAC address, and the time at which the pairing was made to all previously paired devices 10, 20, 30, or 100.

Also preferably, the secure pairing is initiated and completed before one of the following activities is attempted: importation of certificates stored on the smart card or other security token 108 into the connecting user device 10, 20, 30, or 100; private key operations for signing a message to be sent from the connecting user device 10, 20, 30, or 100 or decrypting a message received by the connecting user device 10, 20, 30, or 100; launch of a configuration utility on the connecting user device 10, 20, 30, or 100 for configuring access device-specific settings; a user-initiated device password change on the connecting user device 10, 20, 30, or 100; any other attempt by the connecting device user device 10, 20, 30, or 100 to connect to the access device 104. Other events and activities may trigger a secure pairing. If the connecting user device 10, 20, 30, or 100 and the access device 104 have already entered into a secure pairing, then it is not necessary to re-initiate the secure pairing steps. In a further embodiment, the wireless and/or secure pairing steps may be undertaken automatically without requiring the user to actuate any input on the access device 104, or to manually enter any values displayed by the access device 104 into the connecting user device 10, 20, 30, or 100.

Once the secure pairing is completed, the connecting device 10, 20, 30, or 100 and the access device 104 may negotiate any further communications protocols for the wireless communication link 16, 26, 36, or 106. As described above, the access device 104 and the connecting user device 10, 20, 30 or 100 may have established a master connection key for deriving further connection keys for use in transmitting data, using key establishment protocols known in the art. Thus, the master connection key data may comprise the secure pairing key described above, or it may comprise the secure pairing key along with a further seed value, generated by either the connecting user device 10, 20, 30, or 100 or the access device 104, and transmitted to the access device or the connecting user device. In one embodiment, the connecting user device 10, 20, 30, or 100 may include the seed value, preferably a randomly-generated value at least 64 bytes long, with the instructions sent to the access device 104 along with the selected encryption algorithm. The master connection key may be used by both the access device 104 and the connecting user device 10, 20, 30, or 100 to derive a plurality of keys for use in the transport layer, for example keys for encrypting, decrypting, and authenticating messages transmitted between the access device 104 and the connecting device 10, 20, 30, or 100. A new master connection key is preferably generated for each user device 10, 20, 30, or 100 that pairs with the access device 104; thus, each device 10, 20, 30, or 100 that is securely paired with the access device 104 will store a single master connection key, while the access device 104 will store one master connection key for each device that is validly paired with the access device 104. This master connection key, associated with one of the user devices 10, 20, 30, or 100, may comprise part of the security information and may be stored in association with store of connection information 205 described with reference to FIG. 3, or may be stored in a separate location in the memory 328. A second device 10, 20, 30, or 100 that is paired with the access device 104 is therefore unable to decrypt messages passed between the access device 104 and a first device 10, 20, 30, or 100, even though both devices may be paired with the access device 104 at the same time. As can be seen in FIG. 3, the access device 104 may store either the secure pairing key or the master connection key associated with the user device 10, 20, 30, or 100; if the master connection key is derived from the secure pairing key, and the secure pairing key itself is not used any further by the access device 104, then the master connection key and not the secure pairing key need be stored. In a further embodiment, both the master connection key and the secure pairing key may be stored as part of the security information stored in the store of connection information 205.

In addition to the encryption of messages between the access device 104 and the user device 10, 20, 30, or 100, a further access control method is preferably implemented. Once a first device, for example the mobile communication device 100, completes the secure pairing step, the mobile device 100 then sets a connection password. The connection password may be set by the user in response to a prompt on the mobile communication device 100, and is transmitted to the access device 104 and stored in memory 328. Preferably, the connection password is hashed or otherwise encrypted before it is transmitted to the access device 104, and the access device 104 thus stores the connection password only in hashed or encrypted form. The connection password controls access to the access device 104 by requiring the password for all future connections. The same connection password may be used for all user devices 10, 20, 30, or 100 that are paired with the access device 104. Thus, once a secure pairing is accomplished, as shown in FIG. 4 if the access device 104 determines that the connecting user device 10, 20, 30, or 100 is not the first user device 10, 20, 30, or 100 to be paired with the access device and a connection password already exists, the connection password is transmitted to the connecting user device 10, 20, 30, or 100 for storage, and the connecting user device 10, 20, 30, or 100 is configured to use this password to access the access device 104. The user therefore is not required to memorize an additional password for each device paired with the access device 104. The connection password may also comprise part of the security information, and may be stored in association with the security information stored with the store of connection information 205.

If the secure pairing with a user device is to be terminated or dropped by the access device 104, the access device 104 erases or overwrites any valid (likely non-zero) secure pairing key and/or master connection key data associated with that user device stored in the store of connection information 205 relating to the secure pairing. Thus, upon receipt of an instruction to terminate a secure pairing with a user device, the access device 104 removes at least the valid secure pairing key and/or master connection key associated with the selected device by overwriting at least a portion of the key, or most preferably the entire key, for example with a series of zeroes. As will be understood by those skilled in the art, the erasure of the secure pairing key is the same as overwriting the key with zeroes. If a wireless connection pairing with a user device is to be terminated or dropped by the access device 104, then the access device 104 erases or overwrites any valid wireless link key associated with that user device. Optionally, when a secure pairing with a user device is dropped, if the security information also comprises a connection password, which may be common to all securely paired devices, the connection password may also be erased or overwritten.

A transaction, or security token session, comprises a set of instructions or data transmitted from a connecting user device 10, 20, 30, or 100 to the access device 104, or vice versa. In the preferred embodiment, only a single session may be open at a given time, and a session may be used by only a single connection. The session is typically substantially shorter than the lifetime of the secure or wireless connection pairing.

Preferably, when the connecting user device 10, 20, 30, or 100 is configured to request security functions from a security token 108, the user device 10, 20, 30, or 100 is configured to construct a command which may comprise a number of data for transmission over the wireless link 16, 26, 36, or 106, to the access device 104. The user device 10, 20, 30, or 100 may first construct and transmit a request for a security token session; the request may comprise the access device ID or the MAC address of the access device 104; a device identifier, which may comprise a MAC address for the connecting user device 10, 20, 30, or 100, or a device name previously provided to the access device 104 during the pairing process; and an instruction requesting a session. If the request is acknowledged by the access device 104, the user device 10, 20, 30, or 100 may then construct and transmit one or more commands. Preferably, the command comprises the access device ID or the MAC address of the access device 104; the payload, which may comprise an instruction to be carried out by the access device 104, or other data; and the device identifier of the connecting user device 10, 20, 30, or 100. Upon receipt of the command over the wireless link 16, 26, 36, or 106, the access device 104 is therefore able to determine which device sent the command, and can format any acknowledgement or response with the MAC address or device name of the transmitting connecting user device 10, 20, 30, or 100. Each command is preferably secured or signed using a key derived from the master connection key, which is preferably unique to each connecting user device 10, 20, 30, or 100; the access device 104 will decrypt or authenticate the command using the appropriate key derived from the master connection key stored in the access device 104. The access device 104 may likewise encrypt or sign the commands or responses transmitted to the connecting user device 10, 20, 30, or 100 using keys derived from the master connection key, and the connecting user device 10, 20, 30, or 100 in turn may decrypt or authenticate the received messages using its stored master connection key and the keys derived therefrom.

During a single security token session, a connecting user device 10, 20, 30, or 100 may transmit a number of commands to the access device 104, and the access device 104 may in turn transmit a number of responses or acknowledgements to the connecting user device 10, 20, 30, or 100. While it is unlikely that a second connecting user device 10, 20, 30, or 100 would need to transmit commands to the access device 104 at the same time as a first device if the access device and the paired user devices 10, 20, 30, or 100 are operated by a single user, the access device 104 may be configured to handle simultaneous received commands. In the preferred embodiment, if the access device 104 is engaged in a first security token session with a first user device 10, 20, 30, or 100 when another request for a second security token session is received by the access device 104, the access device 104 caches the request in its memory 328; when the first security token session is terminated, the access device 104 retrieves the cached request and transmits an acknowledgement to the second device user device 10, 20, 30, or 100, thus opening the security token session with the second device. The second user device 10, 20, 30, or 100 then proceeds by transmitting a command to the access device 104. In an alternative embodiment, the access device 104 ignores other requests for security token sessions until the first security token session is terminated. In either of these embodiments, the second user device 10, 20, 30, or 100, while its request for a session is not immediately handled, continues to receive and transmit the heartbeat described above and may be configured to maintain its wireless and secure pairing so long as the heartbeat is received.

In a further embodiment, a further request for a security token session is acknowledged by the access device 104 during an existing security token session, and the access device 104 interleaves the commands received, processed, and the responses transmitted from and to the separate connecting user device 10, 20, 30, or 100. Alternatively, if the request for a security token session includes an identifier of the nature of the transaction required, the access device 104 may prioritize the requested security token sessions in accordance with a predetermined order of precedence. For example, requests for smart card functionality for a user to log into a user device 10, 20, 30, or 100 may be granted higher priority than a request for a user to digitally sign an outbound electronic mail message.

As described above with reference to FIG. 1, the access device 104 may comprises limited means for interacting directly with a user; in the embodiment described above, the access device 104 comprises a single-line display 110, and a single button for user actuation 112. The access device 104 may also comprise further output means, such as an LED for indicating the status of the access device 104, but it will be appreciated that the user interface provided on the access device 104 may not allow for sufficient information to be efficiently conveyed to the user to allow the user to manage the operation of the access device 104 using the device's own input and output means. Furthermore, using only the output means provided on the access device 104, it may be difficult for a user to review the user devices paired with the access device 104 and to ensure that no rogue (unauthorized) devices have been paired with the access 104. Therefore, in the preferred embodiment, the access device 104 and the user devices 10, 20, 30, or 100 are further configured to permit the user to manage and review the status of the access device 104 itself, as well as to manage the various devices that may be connected to the access device 104.

Figure 4A:
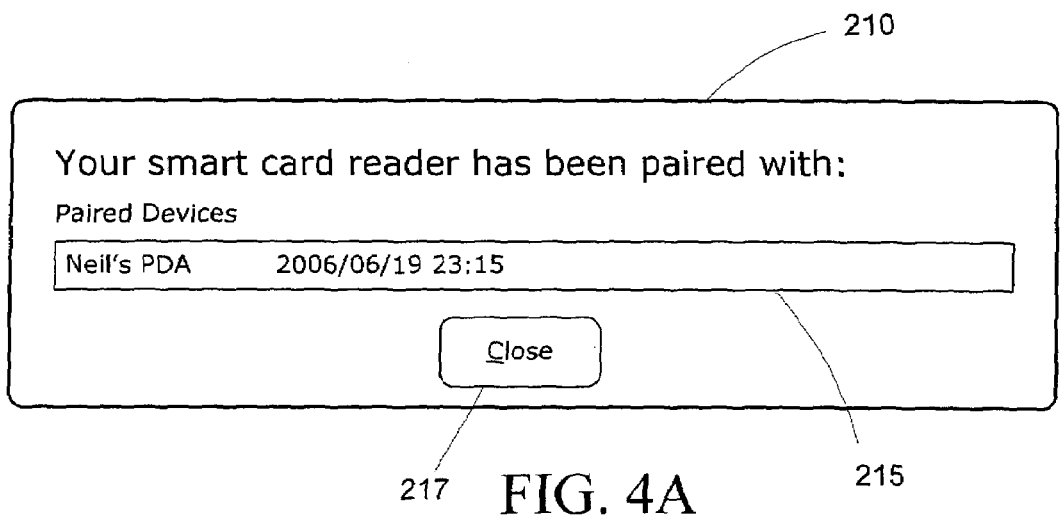
FIG. 4A is a schematic diagram of a notification dialog box.
Figure 4B:
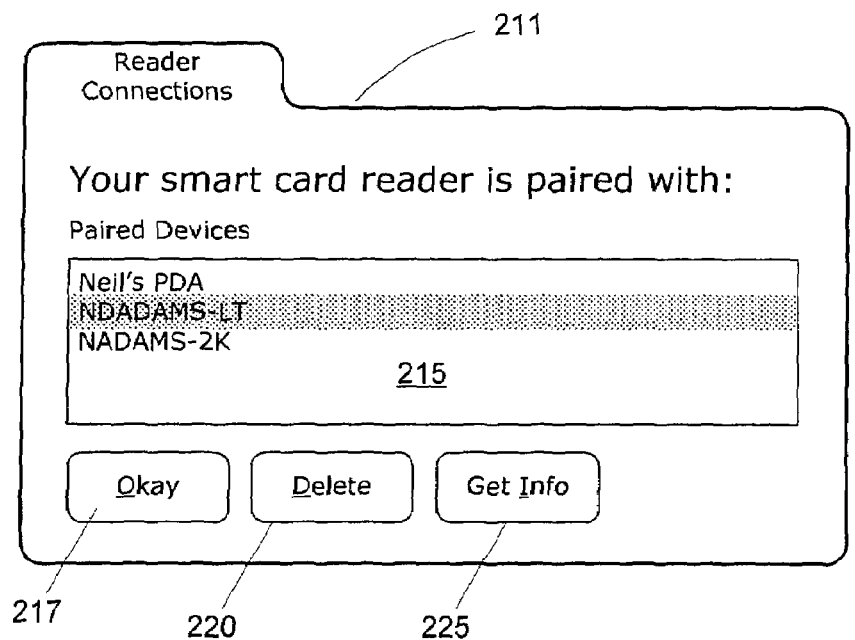
FIG. 4B is a schematic diagram of an options screen listing a set of paired user devices for a reader device.

In the preferred embodiment upon the secure pairing of a user device 10, 20, 30, or 100, preferably the access device 104 adds the relevant pairing information to the store 205, then transmits a signal to each user device 10, 20, 30, or 100 that was already securely paired to the access device 104. The signal comprises a notification to the other user devices 10, 20, 30, or 100 that a new user device has been paired with the access device 104; most preferably the notification comprises the new device's address or identifier, the time the new device was paired, and optionally other information, such as the number of transactions or sessions that the new devices has had with the access device 104. Upon receipt of the notification by the user device 10, 20, 30, or 100, the user device displays the information in a pop-up window to the user of the user device 10, 20, 30, or 100. Most preferably, the notification displayed to the user overlays all other information displayed to the user, so that the user must respond to the notification before further use of the user device. An exemplary pop-up window 210 is shown in FIG. 4A. The window 210 lists the newly-connected device's identifier and the time of connection in text box 215.

In an alternate embodiment, a first user device 10, 20, 30, or 100 may have been previously securely paired to the access reader 104, but then temporarily inactivated by the user (for example, the user may have locked a mobile device 100, or may have logged off at a computer workstation 10, but the secure pairing may still be maintained at the user device 100 or 10 and at the access device 104). The next time the first user device is reactivated by the user, preferably the first user device displays a notification pop-up window (not shown) to the user, which lists in the text box 215 the identifier and time of connection for all other user devices that had connected to the access device 104 since the inactivation of the first user device. To receive the data for the text box 215 in this alternate embodiment, preferably when the first user device is reactivated, it transmits a signal to the access device 104 to notify the access device that it is ready to receive data, namely a list of other user devices that have been securely paired with the access device 104.

Figure 4C:
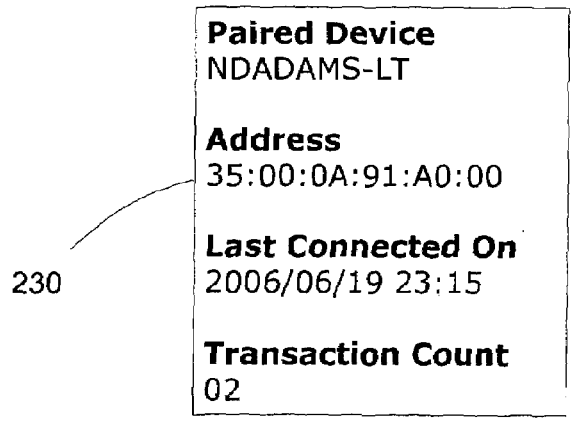
FIG. 4C is a schematic diagram of an informational view for one of the paired user devices listed in FIG. 4B.
Figure 6:
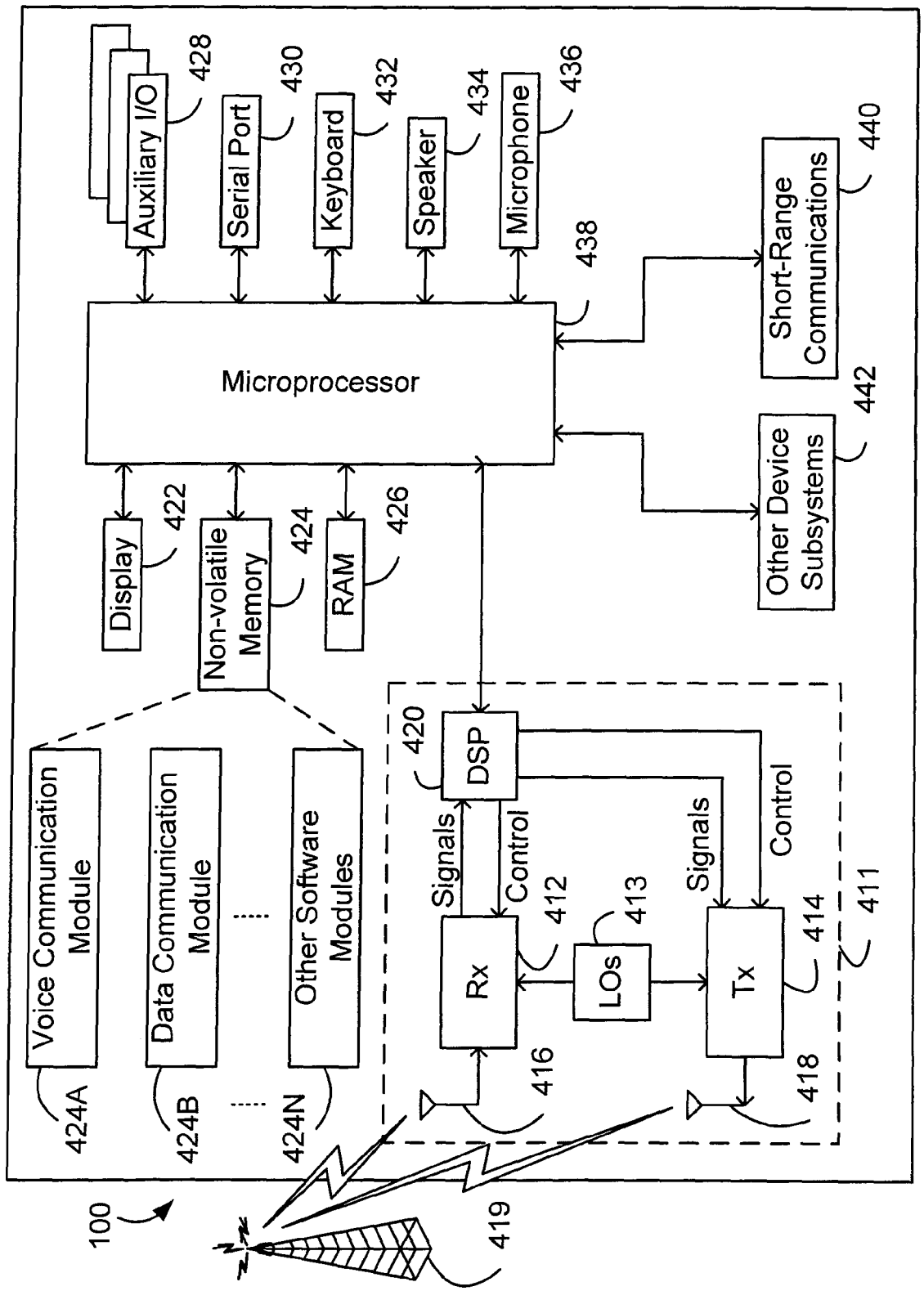
FIG. 6 is a block diagram of a mobile communication device for use in the embodiment of FIG. 1.

In a further embodiment, the access device 104 is also configured to respond to a request issued from a paired user device 10, 20, 30, or 100 for a listing of currently-paired user devices. A response to such a request may comprise a signal containing the notification described above, such that the user device 10, 20, 30, or 100 may display a dialog box such as window 211 shown in FIG. 4B. Alternatively, a user device 10, 20, 30, or 100 may be configured to transmit a request for a listing of currently-paired user devices when the user of the device 10, 20, 30, or 100 invokes a menu command for viewing a menu relating to the operation of the access device 104. Once the user device 10, 20, 30, or 100 receives the listing of currently-paired devices from the access device 104, a dialog box such as window 211 of FIG. 4B may be displayed to the user. The window 211 in a preferred embodiment includes a listing of currently paired devices ("Neil's PDA", "NDAD-AMS-LT" and "NADAMS-2K") in the text box 215, an accept button ("Okay") 217, a delete button 220, and a "Get Info" button 225. Using the window 211 of FIG. 4B, a user may review the listing of currently paired devices, use an input device to select one of the devices listed (here shown with highlighting), and choose to either delete that selected paired device or to obtain further information regarding the device. If the user selects "Get Info" 225, a further status window 230 such as that shown in FIG. 4C is displayed. The further status window 230 comprises the identifier ("NDAD-AMS-LT"), the MAC address of the device, the date the device was last connected to the access device 104, and the number of transactions that the device had so far performed with the access device 104. If the user selects "Delete", then a further dialog box (not shown) may optionally query the user whether he or she means to terminate the connection between the selected user device and the access 104; confirmation by the user to delete the connection would then cause the user device 10, 20, 30, or 100 to transmit an instruction to the access device 104 to terminate the pairing, as described above. The termination of the pairing may comprise terminating only the secure pairing, or may comprise terminating both the secure pairing and the wireless pairing.

A further embodiment of the dialog box, comprising an options screen 240 providing options and status information about a access device 104, is shown in FIG. 5. The menu 240 comprises status information 250 regarding a access device 104, here shown under the heading "Reader Status", and further provides a listing of user devices that are paired with the access device 104. As with the dialog box 211, the user may select one of the listed devices and select an action from the resultant pop-up menu 270. The menu 270 here shows an "Info" option and a "Delete" option that, when actuated by the user, may have similar results as those described above. The "Cancel" option may return the focus to the original menu 240. Thus, the user can monitor the status of any devices connected to the access device 104, and may even monitor the status of the access device 104 itself, without utilizing the user interface of the access device 104.

Thus, by providing the notification signal to each of the user devices 10, 20, 30, or 100 already paired with the access device 104, the likelihood that a rogue user device not known by the authorized user of the access device 104 will gain access to the security token 108 associated with the access device 104 is reduced, because an authorized user of one of the already-paired user devices may see the notification displayed by the user device 10, 20, 30, 100, recognized the newly-paired device as an unauthorized device, and take action to terminate the connection between the access device 104 and the unauthorized device.

Furthermore, if one of the currently paired devices 10, 20, 30, or 100 is lost or stolen, the user may reduce the risk of unauthorized access to the access device 104 and in turn to the security token associated with the access device 104 by invoking the appropriate menu option on any remaining paired device 10, 20, 30, or 100, selecting the lost or stolen device from the list of currently paired devices, and actuating the "Delete" command for that lost or stolen device.

It will be appreciated that the system described herein may also operate in an environment in which the access device 104 communicates with a plurality of user devices 10, 20, 30, 100 as contemplated above, but using different protocols; for example, the access device may communicate over a wireless link with a first user device (for example user device 100), but over a fixed (wired) link with another user device (such as user device 10).

Those skilled in the art will appreciate that other embodiments of the system described herein may include zero or more mobile devices 100, and zero or more other computing devices 10, 20, or 30. In a preferred embodiment, the access device 104 may be configured to allow a simultaneous connection to only one mobile device 100, but a plurality of other computing devices 10 or 20.

As another example, the systems and methods disclosed herein may be used with many different computers and devices, such as a further wireless mobile communications device 100 shown in FIG. 4. With reference to FIG. 4, the mobile device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 4 by the communication tower 419. These voice and data networks may be separate communication networks using separate infrastructure, such as base stations, network controllers, etc., or they may be integrated into a single wireless network.

The transceiver 411 is used to communicate with the network 319, and includes the receiver 412, the transmitter 414, the one or more local oscillators 313 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 311 via a link between the DSP 420 and the microprocessor 438.

The detailed design of the transceiver 411, such as frequency band, component selection, power level, etc., will be dependent upon the communication network 419 in which the mobile device 100 is intended to operate. For example, a mobile device 100 intended to operate in a North American market may include a transceiver 411 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 419, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may both send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

The non-volatile memory 424 preferably provides a file system to facilitate storage of PIM data items on the device. The PIM application preferably includes the ability to send and receive data items, either by itself, or in conjunction with the voice and data communication modules 424A, 424B, via the wireless networks 419. The PIM data items are preferably seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 430 of the mobile device 100 to the serial port of a computer system or device. The serial port 430 may also be used to enable a user to set preferences through an external device or software application, or to download other application modules 324N for installation. This wired download path may be used to load an encryption key onto the device, which is a more secure method than exchanging encryption information via the wireless network 419.

A short-range communications subsystem 440 is also included in the mobile device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A user device adapted to communicate with a security token access device over a wireless link, the access device being adapted to communicate over a wireless link with a plurality of user devices and to be paired with at least one of the plurality of user devices, and further being adapted to maintain connection information relating to each of the plurality of user devices paired with the access device, the user device comprising:
   a processor configured to place the user device in an inactivated state in response to a detected input at the user device while maintaining a pairing with the access device, and to reactivate the user device after the user device was in the inactivated state;
   a receiver for receiving a signal from the access device, the signal comprising a notification that an other user device has been paired with the access device, the other user device being paired with the access device while the user device was in the inactivated state; and
   a transmitter for transmitting a signal, after the user device is reactivated, to the access device to instruct the access device to terminate the pairing with the other user device,
   wherein the transmitter is further adapted to transmit a signal to the access device comprising a request for a listing of user devices currently paired with the access device, and the receiver is further adapted to receive a signal from the access device comprising the listing of user devices currently paired with the access device.

2. The user device of claim 1, further comprising:
   an interface for selecting a user device listed in the listing of user devices;
   and wherein the transmitter is further adapted to transmit a signal to the access device to instruct the access device to terminate the pairing with the selected user device, such that the access device terminates said pairing by overwriting at least a portion of the connection information relating to the selected user device.

3. The user device of claim 2, wherein the wireless link over which the user device is adapted to communicate with the access device comprises a wireless link secured with a secure pairing key associated with the user device, and wherein the access device is adapted to be paired with at least one of the plurality of user devices using a secure pairing key associated with the at least one of the plurality of user devices, such that the portion of connection information comprises any secure pairing key associated with at least one of the plurality of user devices.

4. The user device of claim 1, wherein the user device is a mobile communication device.

5. The user device of claim 1, wherein the detected input at the user device comprises one of a lock command or a log-off command.

6. A security token access device adapted to wirelessly communicate with a plurality of user devices, comprising:
   a transceiver, a processor and a memory configured to enter into a pairing with each of a plurality of user devices, the processor and memory further being configured to store and maintain connection information relating to each of the plurality of user devices thus paired while said each of the plurality of user devices is in an inactivated state in response to a detected input at said user device;
   the transceiver being configured to transmit a notification of a subsequent pairing with a user device to at least one previously paired device of the plurality of user devices, wherein said subsequent pairing occurred while the at least one previously paired device was in the inactivated state, and to receive, from one of the at least one previously paired device, after it is reactivated, an instruction to terminate the subsequent pairing;
   wherein the processor and memory are further configured to terminate the subsequent pairing upon receipt of said instruction by overwriting at least a portion of the connection information relating to said subsequently paired device,
   wherein the transceiver is further configured to receive a request from a requesting user device for a listing of all user devices currently paired with the access device, and to transmit to the requesting user device in response to the request the listing of all user devices currently paired with the access device.

7. The access device of claim 6, wherein the transceiver is further configured to receive, from one of the at least one previously paired device, said previously paired device having been temporarily inactive when the subsequent pairing was made, a notification that, said previously paired device is ready to receive data, and to transmit the notification of the subsequent pairing to said previously paired device upon receipt of said notification that said previously paired device is ready to receive data.

8. The access device of claim 6, wherein the pairing with each of a plurality of user devices is a secure pairing associated with security information, and the portion of connection information comprises the security information.

9. The access device of claim 8, wherein the security information for each of the plurality of user devices comprises at least a secure pairing key.

10. The access device of claim 9, wherein the security information for each of the plurality of user devices further comprises a master connection key.

11. The access device of claim 8, wherein the connection information further comprises a connection pairing key and an address associated with each of the plurality of user devices thus paired.

12. The access device of claim 11, wherein the processor is further adapted to overwrite the secure pairing key associated with the one of the plurality of user devices.

13. The access device of claim 12, wherein the processor is further adapted to overwrite the connection pairing key associated with the one of the plurality of user devices.

14. A computing device comprising the access device of claim 6.

15. A mobile communication device comprising the access device of claim 6.

16. The access device of claim 6, wherein the detected input at the user device comprises one of a lock command or a log-off command.

17. A method for managing a plurality of user devices adapted to communicate over a wireless link with a security token access device, the method being implemented by the access device and comprising:
  receiving a request for a connection from each of a plurality of user devices, each request comprising an identifier corresponding to each of the plurality of user devices;
  for each request, generating and transmitting a secure pairing value corresponding to each of the plurality of user devices for establishing a secure pairing with each said user device;
  for each of said user device, storing connection information comprising the corresponding identifier and a key derived from the corresponding secure pairing value;
  while a first one of the plurality of user devices thus paired is in an inactivated state in response to a detected input at the user device, receiving a request for a connection from a subsequent user device, the request comprising an identifier corresponding to said subsequent user device;
  generating and transmitting a subsequent secure pairing value corresponding to the subsequent user device for establishing a secure pairing with the subsequent user device;
  storing connection information comprising the identifier corresponding to the subsequent user device and a key derived from the subsequent secure pairing value;
  transmitting a notification to the first one of the plurality of user devices thus paired that the subsequent user device has been paired with the access device;
  receiving an instruction from said first one of the plurality of user devices thus paired, after said user device is reactivated, to terminate the pairing between the access device and the subsequent user device;
  in response to said instruction, overwriting the key derived from the subsequent secure pairing value;
  receiving a request from a requesting user device for a listing of all user devices currently paired with the access device; and
  transmitting to the requesting user device in response to the request the listing of all user devices currently paired with the access device.

18. The method of claim 17, wherein the connection information further comprises an associated connection pairing value and an associated user device address.

19. The method of claim 18, further comprising, in response to said instruction, overwriting the connection pairing value associated with the subsequent user device.

20. The method of claim 17, further comprising:
  after generating and transmitting the secure pairing value corresponding to each of the plurality of user devices, for each of said plurality of user devices,
    establishing at the access device corresponding master connection key data for generating a corresponding master connection key for said user device;
    generating said corresponding master connection key from the corresponding master connection key data,
    wherein the each of said plurality of user devices is configured to generate said corresponding master connection key from the corresponding master connection key data, the corresponding master connection key being used to secure data transmitted between the access device and said user device, and wherein data transmitted to said user device by the access device comprises the corresponding identifier;
  after generating and transmitting the subsequent secure pairing value,
    establishing at the access device subsequent master connection key data for generating a subsequent master connection key for said subsequent user device;
    generating said subsequent master connection key from the subsequent master connection key data,
    wherein the subsequent user device is configured to generate the subsequent master connection key from the subsequent master connection key data, the subsequent master connection key being used to secure data transmitted between the access device and the subsequent user device, and wherein data transmitted to the subsequent user device by the access device comprises the subsequent identifier;
  and wherein the connection information for each user device securely paired with the access device further comprises the master connection key associated with said user device,
  and further wherein overwriting the key further comprises overwriting the subsequent master connection key.

21. A computer program product comprising a non-transitory computer-readable medium comprising code executable by a computing device for carrying out the method of claim 17.

22. A smart card reader adapted to communicate with a plurality of user devices and to be securely paired with at least one of the plurality of user devices for implementing the method recited in claim 17.

23. The method of claim 17, wherein the detected input at the user device comprises one of a lock command or a log-off command.

* * * * *